(12) United States Patent
Adner et al.

(10) Patent No.: US 6,688,481 B1
(45) Date of Patent: Feb. 10, 2004

(54) MOBILE CRANE

(75) Inventors: Andric Adner, Contwig (DE); Walter Stowasser, Zweibrücken (DE); Hans-Jürgen Höhn, Kaiserslautern (DE); Christian Fuhrmeister, Homburg (DE)

(73) Assignee: Terex-Demag GmbH & Co. KG, Zweibrücken (DE)

( * ) Notice: Subject to any disclaimer, the term of this patent is extended or adjusted under 35 U.S.C. 154(b) by 122 days.

(21) Appl. No.: 09/680,692

(22) Filed: Oct. 6, 2000

(30) Foreign Application Priority Data

Oct. 6, 1999 (DE) .......................... 199 48 831

(51) Int. Cl.$^7$ ................................ B66C 9/00
(52) U.S. Cl. .................. 212/195; 180/65.2; 212/271
(58) Field of Search ................ 212/195, 271; 180/65.2

(56) References Cited

U.S. PATENT DOCUMENTS

| | | | | |
|---|---|---|---|---|
| 3,799,362 A | * | 3/1974 | Oswald et al. | 214/1 D |
| 4,177,869 A | * | 12/1979 | Crabiel | 180/6.58 |
| 4,185,710 A | * | 1/1980 | Kronogard | 180/65.2 |
| 4,200,162 A | * | 4/1980 | Tax | 180/23 |
| 4,243,148 A | * | 1/1981 | Lampson | 212/196 |
| 4,467,604 A | * | 8/1984 | Forster | 60/484 |
| 4,489,242 A | * | 12/1984 | Worst | 307/10 R |
| 4,498,554 A | * | 2/1985 | Young et al. | 180/236 |
| 4,502,558 A | * | 3/1985 | Mauri | 180/65.2 |
| 4,572,311 A | * | 2/1986 | Oswald et al. | 180/6.48 |
| 4,809,803 A | * | 3/1989 | Ahern et al. | 180/65.4 |
| 5,333,452 A | * | 8/1994 | Dameron | 180/6.58 |
| 5,359,308 A | * | 10/1994 | Sun et al. | 335/216 |
| 5,405,028 A | * | 4/1995 | Kaspar | 212/163 |
| 5,669,517 A | * | 9/1997 | Donaldson et al. | 212/196 |
| 5,671,932 A | * | 9/1997 | Chapman | 280/47.11 |
| 6,065,565 A | * | 5/2000 | Puszkiewwicz et al. | 182/2.9 |
| 6,192,839 B1 | * | 2/2001 | Takeshita et al. | 123/41.49 |

FOREIGN PATENT DOCUMENTS

| | | | |
|---|---|---|---|
| DE | AS 1 231 867 | | 1/1967 |
| DE | AS 25 25 867 | | 2/1976 |
| JP | 7-67394 | * | 3/1995 |
| JP | 9-278371 | * | 10/1997 |

OTHER PUBLICATIONS

Kunze, G.: u.a. Antriebstechnik 37 (1998) No. 5, pp. 55–58.
Firmenschrift LBC-141.-B-04/80-5.d; Liebherr–Werk Biberach GmbH, D-7950 Biberach (May 1988).
Firmenschrift: MS "Augsburg" mit 110-V-Gleichstromanlage; Siemens–Schuckertwerke AG (Sonderdruck aus der "Zeitschrift für Binnenschiffahrt", 84. Jg., Jan. 1957, vol. 1, pp. 16–20.

* cited by examiner

*Primary Examiner*—Thomas J. Brahan
(74) *Attorney, Agent, or Firm*—Henry M. Feiereisen

(57) ABSTRACT

A mobile crane, includes an undercarriage, a superstructure rotatably mounted on the undercarriage for supporting a counterweight, a slewable boom assembly and an operator's cab. At least one electric motor propels the undercarriage in an operating direction and is supplied with electric power for driving and crane operations by a power supply unit which is connected to the at least one electric motor by a cabling and configured as a diesel-electric drive, or a battery, or a multi-system drive formed by a combination of a diesel-electric drive with a battery, or a fuel-cell system.

8 Claims, 5 Drawing Sheets

MOBILE CRANE

CROSS-REFERENCES TO RELATED APPLICATIONS

This application claims the priority of German Patent Application, Serial No. 199 48 831.2, filed Oct. 6, 1999, the subject matter of which is incorporated herein by reference.

BACKGROUND OF THE INVENTION

The present invention relates, in general, to a mobile crane, and more particularly to a truck crane of a type having a driven undercarriage and a superstructure rotatably mounted on the undercarriage for supporting a counterweight, a slewable boom assembly and an operator's cab.

Small mobile cranes with a load-carrying capability of less than 100 tons are frequently used in closed halls for lifting machine components. Therefore, mobile cranes should exhibit a compact design, i.e. small dimensions, while still exhibiting maneuverability, especially when requiring travel in tight radii inside the hall. Moreover, a low emission of pollutants is demanded, in particular when the crane is used in narrow city areas such as pedestrian zones.

An example of a conventional mobile crane is shown in FIG. 1. The mobile crane includes an undercarriage or chassis 1 which is supported for mobility on wheels 35 fitted to front and rear axles 2, 3. Mounted on the undercarriage 1 for rotation is a superstructure 4 which supports a telescopic boom assembly made up of a base section 5 and three boom sections 6, 7, 8 fitting into each other. The smallest boom section 8, called fly section, carries the boom head 9 for guiding the hoisting rope (not shown). The superstructure 4 further carries a counterweight 10 and an operator's cab 11. The drive mechanism for propelling the wheels 35 in an operating direction includes a conventional diesel engine 12 which has attached thereto a transmission 13 connected via a cardan shaft 14 to a transfer case 15 for distributing the driving power of the diesel engine 12 via two cardan shafts 16, 17 to bevel gearings 18, 19 arranged on the axles 2, 3.

Conventional mobile cranes of this type thus have a drive train comprised of diesel engine, automatic transmission, transfer case, cardan shafts. In addition, hydraulic pumps are provided to implement crane operations. These cranes suffer, however, shortcomings because all these components can be installed only in specific locations so that the degree of freedom of placement is very restricted. Shifting operations inevitably result in engine-torque jumps and transient operating states that are determinative for the toxic constituents contained in the exhaust gas.

SUMMARY OF THE INVENTION

It is thus an object of the present invention to provide an improved mobile crane, obviating the afore-stated drawbacks.

In particular, it is an object of the present invention to provide an improved mobile crane which provides a high degree of freedom for installation of components of the drive train and operates at substantially zero or at least very low emission of pollutants.

These objects, and others which will become apparent hereinafter, are attained in accordance with the present invention by providing an undercarriage, a superstructure rotatably mounted on the undercarriage for supporting a counterweight, a slewable boom assembly and an operator's cab, at least one electric motor for propelling the undercarriage in an operating direction, and a power supply unit for supply of electric power for driving and crane operations, whereby the power supply unit is drivingly connected via a cabling to the at least one electric motor and can be configured as a diesel-electric drive, or a battery, or a multi-system drive formed by a combination of a diesel-electric drive with a battery, or a fuel-cell system.

In accordance with the present invention, the propulsion of the crane is provided by at least one electric motor whereas the power supply for the driving and crane operations is assumed by a diesel-electric drive, or a battery, or a multi-system drive formed by a combination of a diesel-electric drive with a battery, or a fuel-cell system, connected to the at least one electric motor via a cabling. A supply of electric power through use of a high-performance battery alone results in a zero emission of pollutants because the battery can be re-charged via a mains power outlet. Thus, by utilizing the battery only, crane works as well as driving operation can be done without emission of pollutants.

When electric power is supplied by the multi-system drive, it is suitable to carry out the driving and crane operations predominantly by the diesel-electric drive and only temporarily by the battery. The use of a fuel-cell system as power supply unit results in water as waste product so that this variation essentially results also in zero emission of pollutants.

According to another feature of the present invention, the undercarriage is supported on wheels for movement in the operating direction, whereby each wheel is driven by an electrically operated wheel-hub motor. Another option is to connect to each of the front and rear axles, to which the wheels are fitted, with a separate electric motor. In some cases, it may be suitable to use only a single electric motor which is drivingly connected to the axles via a transfer case and cardan shafts.

As a result of a separate power supply unit and the provision of an electric motor for driving and crane operations the crane, the wheels can be mechanically de-coupled from the diesel engine, thereby realizing a greater freedom of installation of the drive train. For example, the diesel-electric drive may be located in a rear portion of the undercarriage, and thereby used as part of the counterweight. The same is true for the battery or the fuel-cell system which can be disposed as a separate counterweight on the superstructure. Another option may be the placement of the diesel-electric drive and the battery in the superstructure as part of the counterweight.

The provision of an electric motor for driving and operating the crane results in a smooth crane operation and permits an optimum dimensioning of the diesel engine as the diesel engine can run continuously in the most favorable speed range. As a consequence, the emission of pollutants decreases accordingly.

According to another feature of the present invention, the diesel-electric drive may be used only for drive-in of the mobile crane into a hall and to subsequently connect the crane in the hall to a power outlet of the electric mains, provided the electric infrastructure exists, so that the crane operation can be carried out without emission of pollutants.

BRIEF DESCRIPTION OF THE DRAWING

The above and other objects, features and advantages of the present invention will be more readily apparent upon reading the following description of preferred exemplified embodiments of the invention with reference to the accompanying drawing, in which.

DETAILED DESCRIPTION OF PREFERRED EMBODIMENTS

Figure 1:
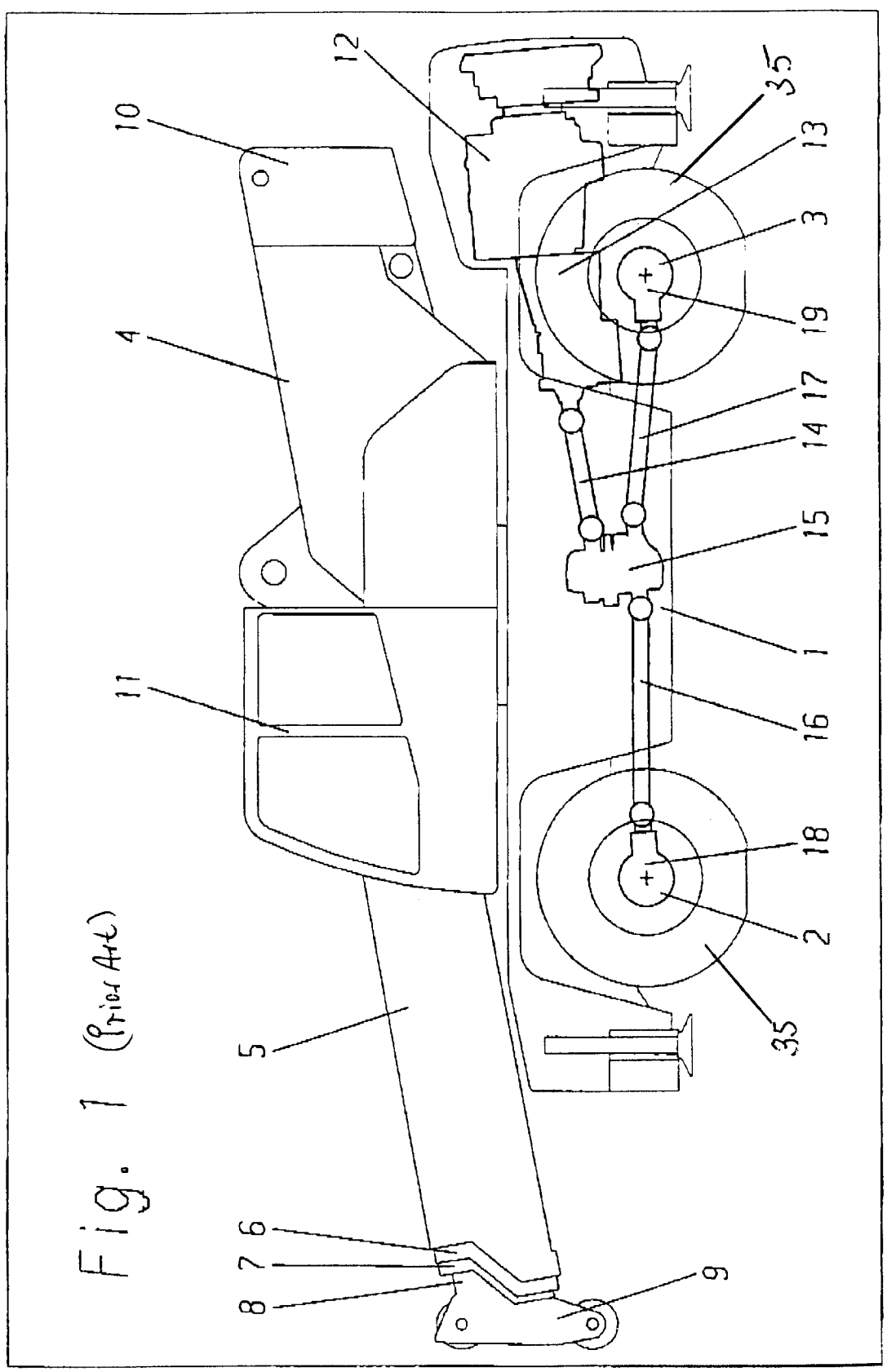
FIG. 1 is a schematic longitudinal view of a conventional mobile crane.

Throughout all the FIGS., same or corresponding elements are generally indicated by same reference numerals.

Figure 2:
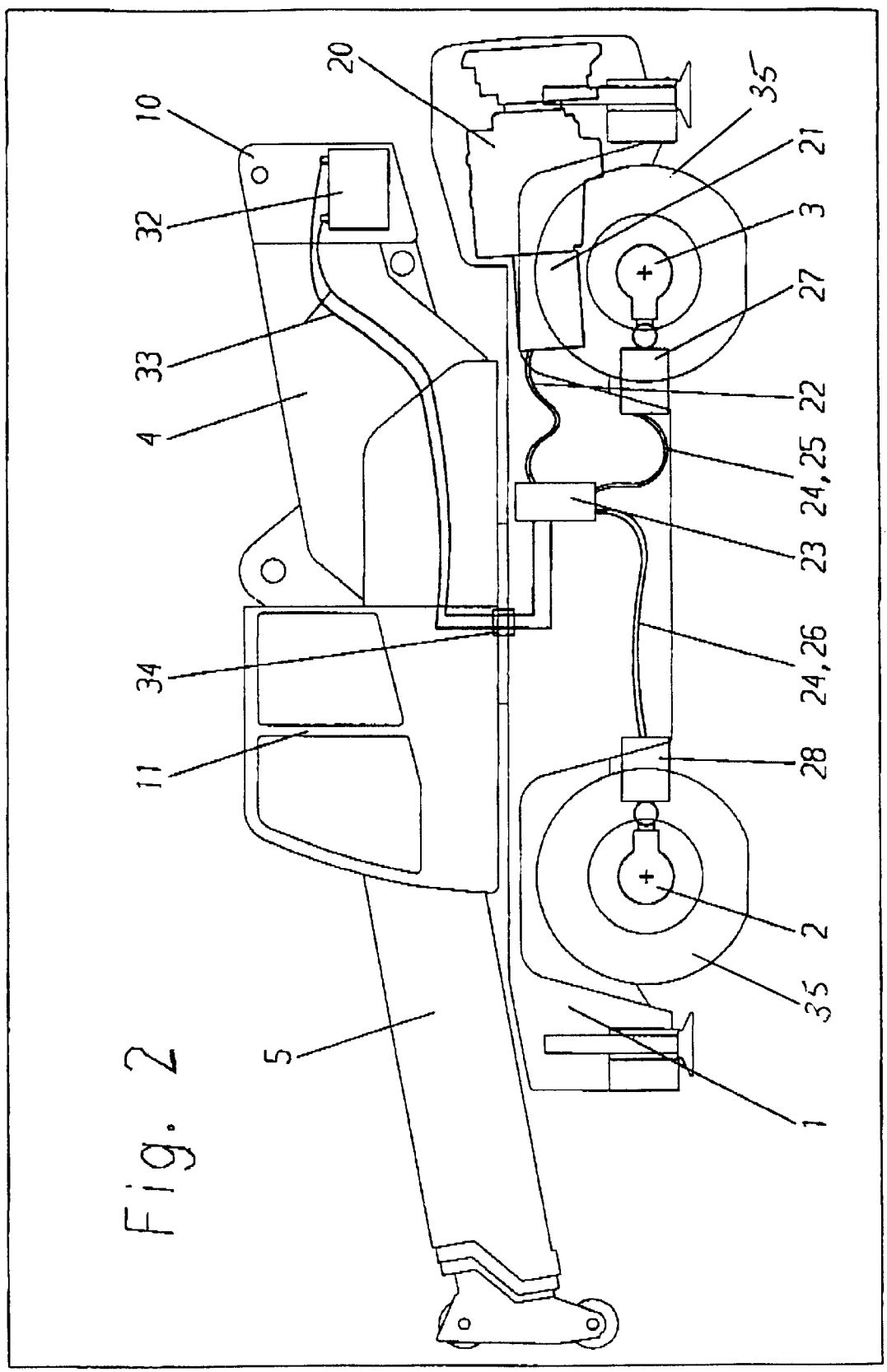
FIG. 2 is a schematic longitudinal view of a mobile crane according to the present invention.
Figure 4:
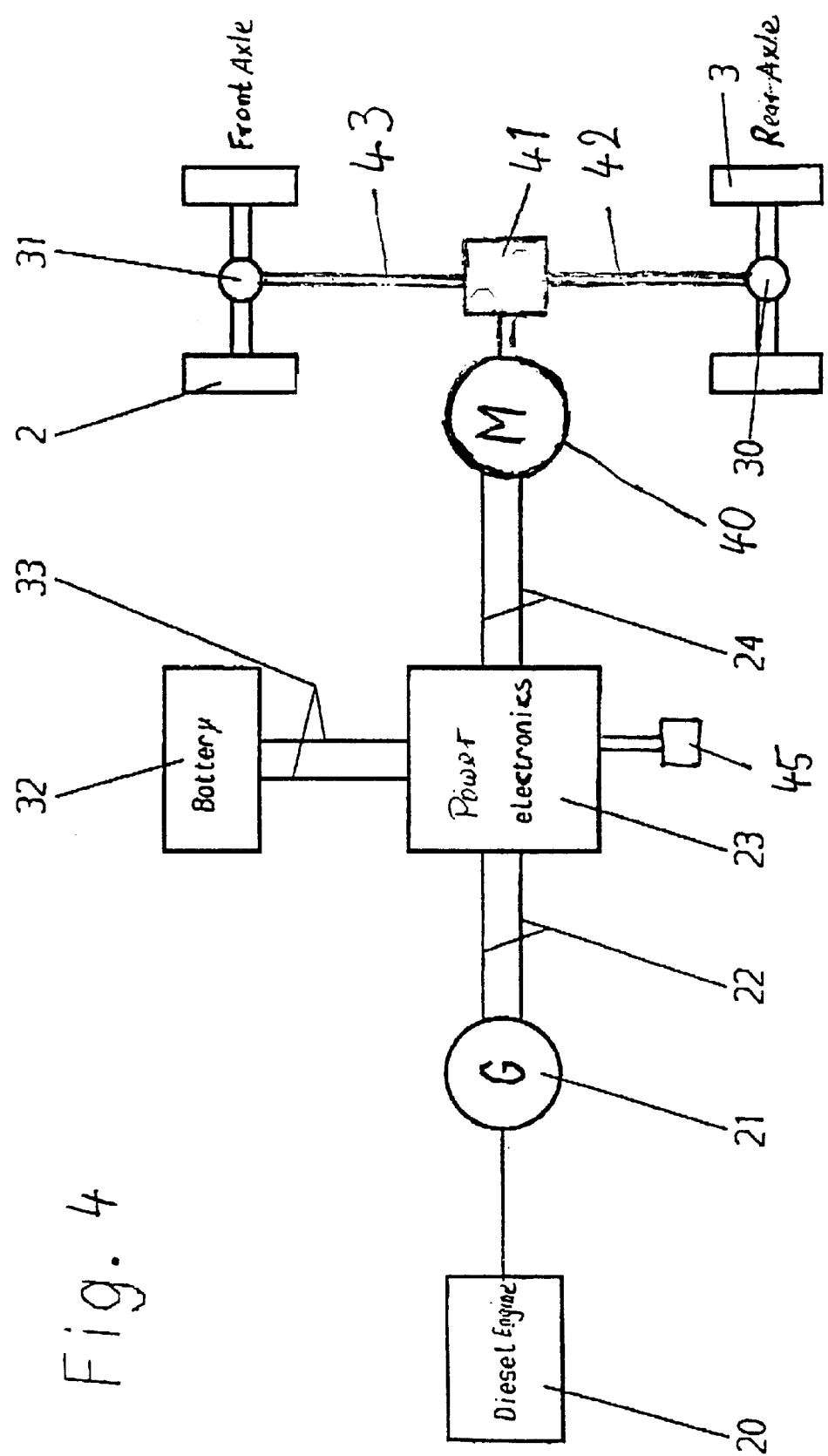
FIG. 4 is a block diagram of another example of a drive train for providing the electric power for the mobile crane.

Turning now to the drawing, and in particular to FIG. 2, there is shown a schematic longitudinal view of a mobile crane according to the present invention. Parts corresponding with those in FIG. 1 are denoted by identical reference numerals and not explained again. In accordance with the present invention, provision is made for a power supply unit to provide electric power to electric motors 27, 28 for propelling the crane and to carry out crane operations. In the non-limiting example of FIG. 2, the electric motor 27 is in driving relationship with the axle 3 whereas the electric motor 28 is in driving relationship with the axle 2. The power supply unit may be a diesel-electric drive, or a battery, or a multi-system drive formed by a combination of a diesel-electric drive with a battery, or a fuel-cell system. Of course, as shown in FIG. 4, it is also conceivable to provide a single electric motor 40 being positioned downstream of the power supply unit and operatively connected to the axles 2, 3 via a transfer case 41 and cardan shafts 42, 43. The mobile crane may further be provided with a mains power outlet 45 for connection of the power supply unit and supply of electric energy required for driving and crane operations.

Figure 3:
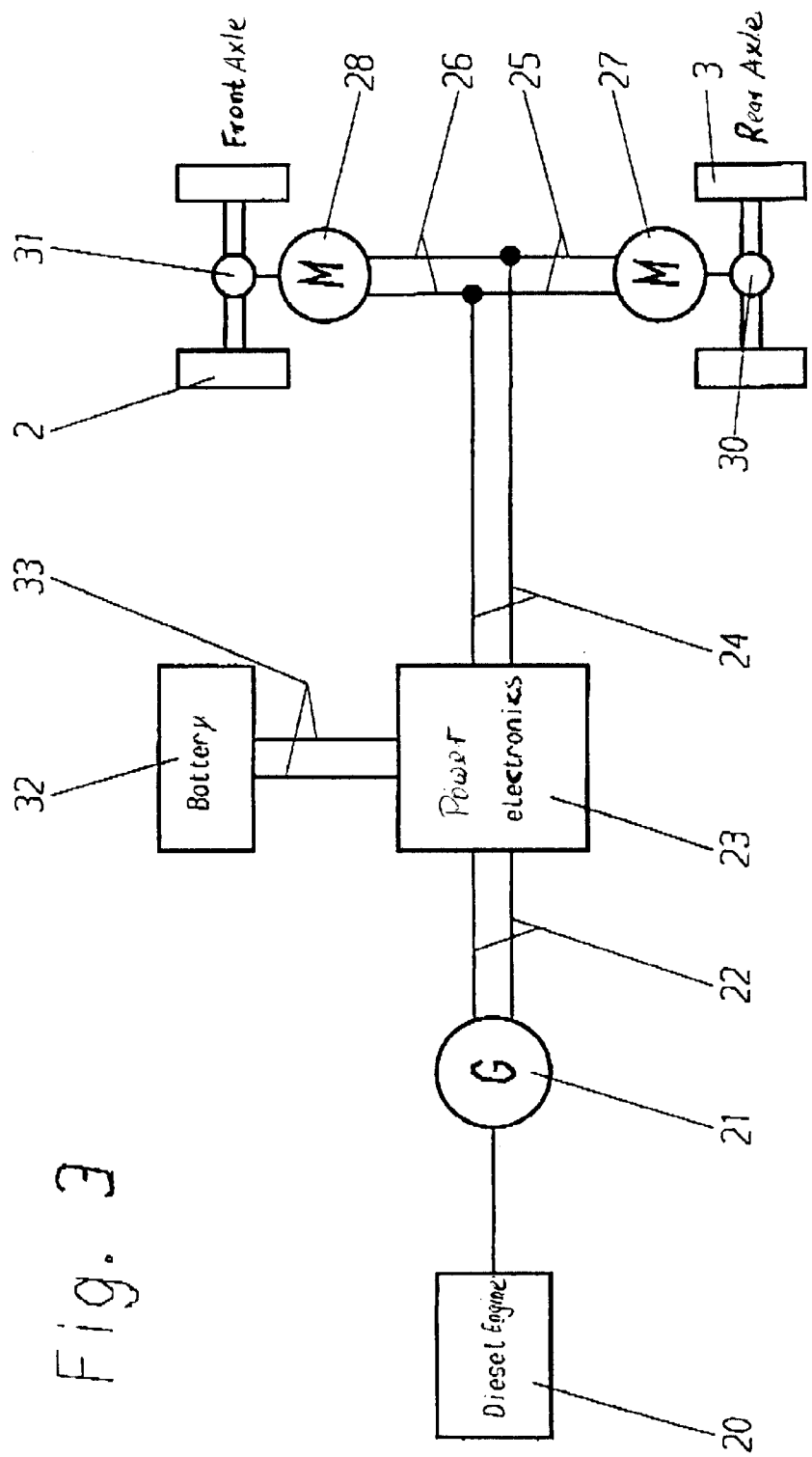
FIG. 3 is a block diagram of an exemplified drive train in the form of a diesel-electric drive for providing the electric power for the mobile crane of FIG. 2.
Figure 5:
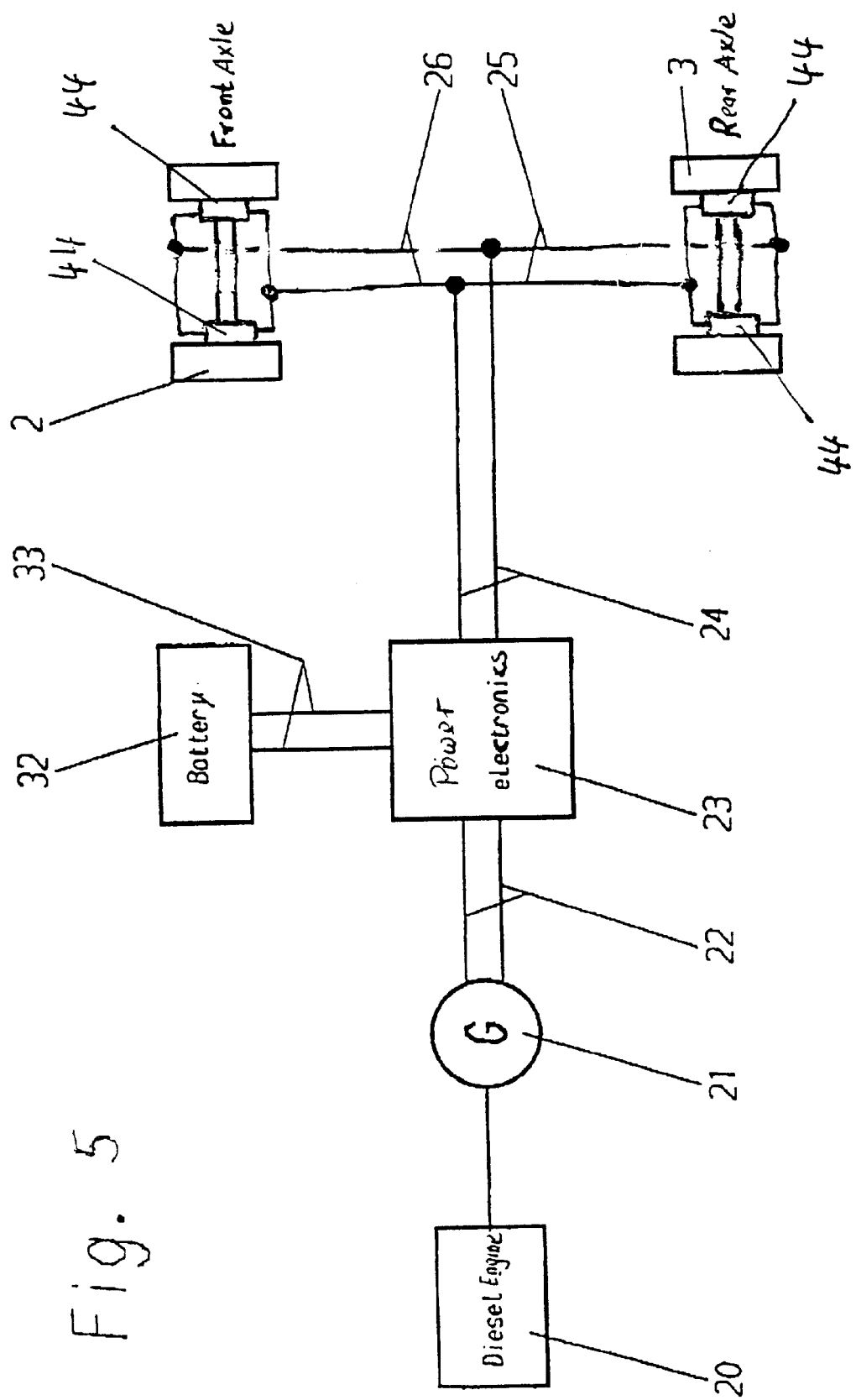
FIG. 5 is a block diagram of still another example of a drive train for providing the electric power for the mobile crane.

Referring now to FIG. 3, there is shown a block diagram of an exemplified power supply unit in the form of a diesel-electric drive for providing the electric power for the mobile crane. The diesel-electric drive is mounted in a rear portion of the undercarriage 1 and includes a diesel engine 20 which is mechanically connected to and drives a generator 21. Electric power produced by the generator 21 is supplied via cable 22 to a power electronics 23 which is disposed within the undercarriage 1 and supplies electric power via cables 24, 25, 26 to the electric motors 27, 28. The mechanical connection between the axle 2 and the electric motor 28 is realized via a differential gear mechanism 30, whereas the mechanical connection between the axle 3 and the electric motor 27 is realized via a differential gear mechanism 31. Of course, as shown in FIG. 5, it is also possible to operatively connect the wheels 35 with electrically driven wheel-hub motors in one-to-one correspondence whereby the wheel-hub motors 44 are linked via a suitable cabling to the power electronics 23.

In addition, a battery 32 is disposed in the superstructure 4 and connected via cabling 33 to the power electronics 23. As a consequence of the separation of the diesel engine 20 from the wheels 35, the battery 32 as well as the diesel-electric drive comprised of diesel engine 20 and generator 21 can be so arranged as to contribute as counterweight in addition to the counterweight 10. It is also possible to so arrange the diesel-electric drive 20, 21 and the battery 32 in the superstructure 4 as to form part of the counterweight 10. The cabling 33 between the battery 32 in the superstructure 4 and the power electronics 23 in the undercarriage 1 is suitably conducted via a rotary feedthrough 34, shown only schematically in FIG. 2.

It will be appreciated by persons skilled in the art that the integration of a multi-system drive comprised of diesel-electric drive 20, 21 and battery 32 in the mobile crane for supplying the electric power to the electric motors 27, 28 is shown and described by way of example only. As set forth above, the supply of electric power may be implemented also in other ways such as the use of a fuel-cell system or the use of only a single heavy-duty battery, or the use of only a diesel-electric drive. Likewise, as a result of the freedom of arrangement, the disposition of any one of the power supply units set forth above may be so selected as to form part of the counterweight 10.

While the invention has been illustrated and described as embodied in a mobile crane, it is not intended to be limited to the details shown since various modifications and structural changes may be made without departing in any way from the spirit of the present invention.

What is claimed as new and desired to be protected by letters patent is set forth in the appended claims.

What is claimed is:

1. A mobile truck crane for movement about a jobsite under its own power without restriction to a predetermined travel path, comprising:

an undercarriage;

a superstructure rotatably mounted on the undercarriage;

a counterweight;

a slewable boom assembly;

an operator's cab, wherein the counterweight, the slewable boom assembly and the operator's cab are supported on the superstructure;

at least one motor for propelling the undercarriage in an operating direction, said motor being an electric motor; and a power supply unit for supply of electric power for driving and crane operations, said power supply unit drivingly connected via a cabling to the at least one electric motor and including a multi-system drive formed by a combination of a diesel-electric drive with a battery, wherein at least one of the diesel-electric drive and the battery of the power supply unit forms part of the counterweight in the superstructure, wherein the multi-system drive is constructed to provide the electric power supply predominantly by the diesel-electric drive and temporarily by the battery, and wherein the diesel-electric drive is located in a rear portion of the undercarriage.

2. The crane of claim 1 wherein the undercarriage is supported on wheels for movement in the operating direction, said electric motor constructed as an electrically operated wheel-hub motor for driving said wheels.

3. The crane of claim 1 wherein the undercarriage is supported on wheels fitted on front and rear axles, and further comprising a second said electric motor, both said electric motors being operatively connected to the front and rear axles in one-to-one correspondence.

4. The crane of claim 1 wherein the undercarriage is supported on wheels fitted on axles, said electric motor being supplied with current from the power supply unit and operatively connected to the axles via a transfer case and cardan shafts.

5. The crane of claim 1, and further comprising a power electronics operatively connected via a cabling to the power supply unit and the at least one electric motor.

6. The crane of claim 1, and further comprising a mains power outlet mounted to the crane for connection of the power supply unit.

7. A mobile truck crane for movement about a jobsite under its own power without restriction to a predetermined travel path, comprising:

an undercarriage;

a superstructure rotatably mounted on the undercarriage for supporting a boom and an operator's cab;

a counterweight supported by the superstructure for providing stability;

at least one electric motor in driving relationship with the undercarriage to propel the crane in an operating direction; and a power supply unit for supply of electric power to the at least one electric motor, said power supply unit including a multi-system drive formed by a combination of a diesel-electric drive with a battery, wherein at least one of the diesel-electric drive and the battery of the power supply unit forms part of the counterweight in the superstructure, and wherein the multi-system drive is constructed to provide the electric power supply predominantly by the diesel-electric drive and temporarily by the battery, and wherein the diesel-electric drive is located in a rear portion of the undercarriage.

8. The crane of claim 7, wherein the at least one electric motor is connected to the power supply unit by a cable assembly, thereby realizing flexibility of installation and permitting disposition of the power supply unit at a suitable location.

* * * * *